United States Patent [19]

Nakatsuka

[11] Patent Number: 4,970,614
[45] Date of Patent: Nov. 13, 1990

[54] ADJUSTABLE MAGNETIC RECORDING AND REPRODUCING HEAD UNIT

[75] Inventor: Mamoru Nakatsuka, Kashihara, Japan

[73] Assignee: Sharp Kabushiki Kaisha, Osaka, Japan

[21] Appl. No.: 288,310

[22] Filed: Dec. 22, 1988

[30] Foreign Application Priority Data

Dec. 25, 1987 [JP] Japan .................. 62-332641

[51] Int. Cl.$^5$ .............................................. G11B 5/56
[52] U.S. Cl. ..................................... 360/109; 360/104
[58] Field of Search ............... 360/109, 104, 105, 106, 360/128, 129, 75, 76

[56] References Cited

U.S. PATENT DOCUMENTS

| 3,893,188 | 7/1975 | Shoemaker | 360/109 |
| 4,158,868 | 6/1979 | Jenkins | 360/109 |
| 4,623,947 | 11/1986 | Kasahara | 360/109 |

FOREIGN PATENT DOCUMENTS

| 0045967 | 3/1985 | Japan | 360/104 |
| 62-187436 | 8/1987 | Japan . | |
| 62-187437 | 8/1987 | Japan . | |
| 63-225911 | 9/1988 | Japan . | |
| 1270790 | 11/1986 | U.S.S.R. | 360/104 |

Primary Examiner—David J. Severin

[57] ABSTRACT

A magnetic recording and reproducing head unit is made up of a tape guide and at least one magnetic head, wherein a top plate and a bottom plate are connected with a predetermined distance therebetween, a center member is disposed between the top and bottom plates to provide the tape guide, a reference plane is set on either of the opposing faces of the top and bottom plates, a convex portion is formed on the side of the center member, the magnetic head is inserted along the center member between the top and bottom plates, the end faces of the magnetic head are made to push against the reference plane to thereby limit the height of the track pattern, and the magnetic head is pivotable with the convex portion acting as a fulcrum to thereby enable azimuth adjustment.

9 Claims, 7 Drawing Sheets

ADJUSTABLE MAGNETIC RECORDING AND REPRODUCING HEAD UNIT

FIELD OF THE INVENTION

The present invention relates to a magnetic recording and reproducing unit for a magnetic recording and reproducing device and particularly to a magnetic recording and reproducing unit for facilitating adjustment in height of the track pattern and azimuth adjustment as the magnetic head is attached to the tape guide.

BACKGROUND OF THE INVENTION

Recently, with digital magnetic recording devices such as a tape recorder, it has become necessary to arrange a plurality of magnetic heads at a fixed distance to cope with diversified requirements. Also, it has become important to set a relative positional relationship between each of the magnetic heads and the tape guide with a high degree of precision.

Figure 6A:
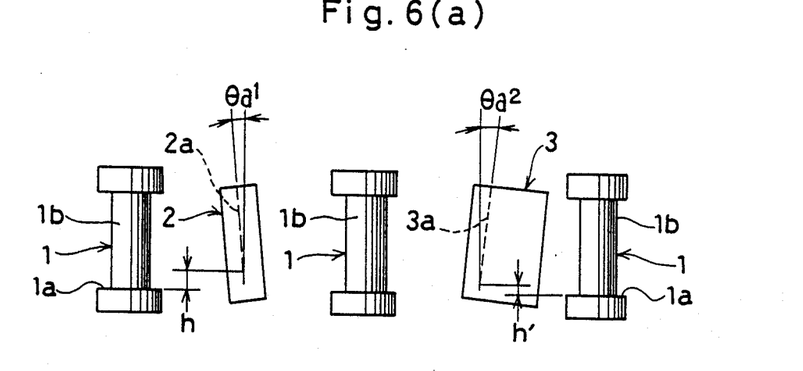
Figure 6B:
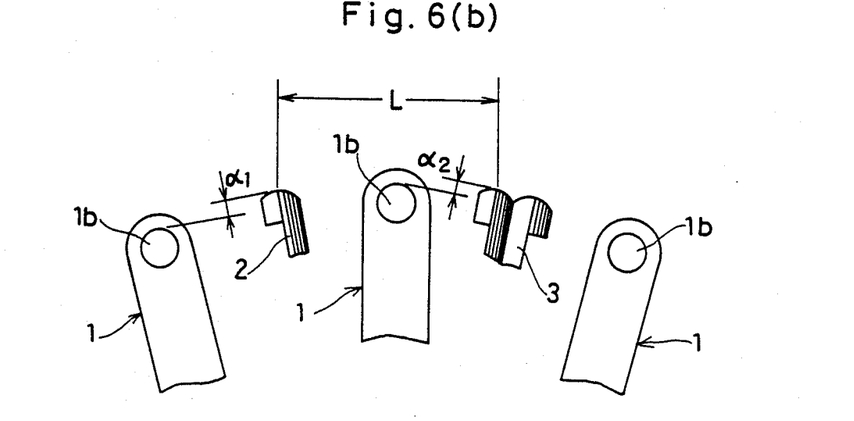

By the way, among the known conditions for concrete positional relationship between a magnetic head and a tape guide are, as shown in FIG. 6 (a), the height h, h' of track patterns 2a, 3a and the inclination $\theta_{a1}$, $\theta_{a2}$ of the track patterns 2a, 3a against the reference planes 1a, 1a . . . of tape guide members 1, 1 . . . , the extent of protrusion $\alpha_1$, $\alpha_2$ of magnetic heads 2, 3 from tape guide poles 1b and 1b . . . and the distance L between magnetic heads 2, 3 shown in FIG. 6 (b) and, further, such factors as tilt and mechanical adjustment, although these are not shown in the figure. Thus, there are quite a number of conditions to be satisfied and since high precision is required with regard to each condition, it was hitherto accepted to be difficult to preassemble the tape guide and then fix the magnetic head 2 and 3 to the tape guide.

Figure 7:
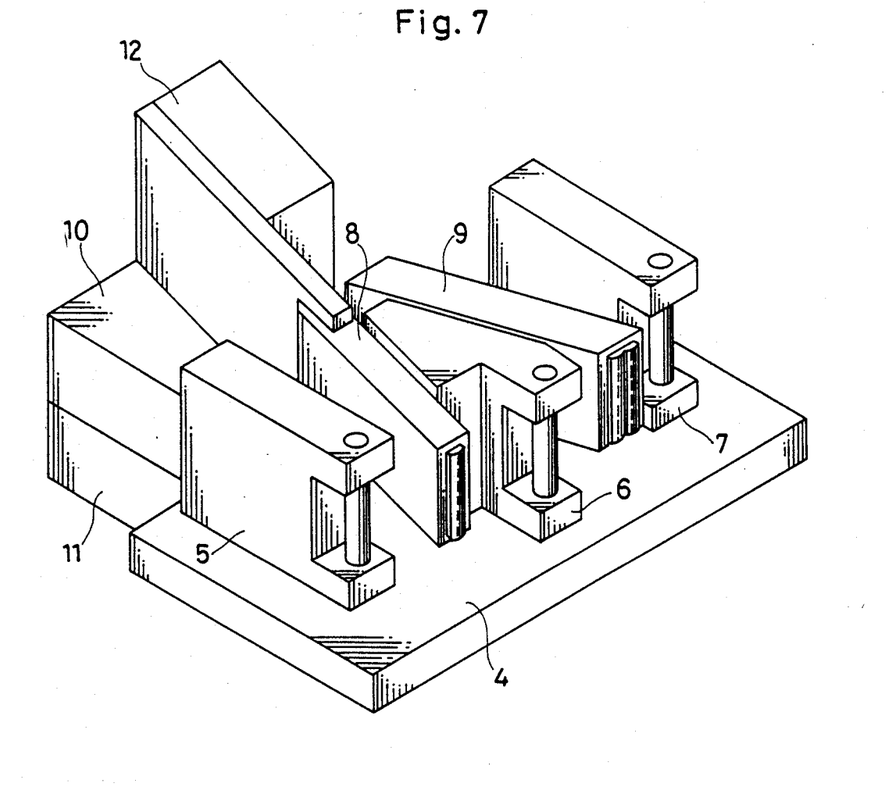
FIG. 7 is a perspective view showing how a conventional magnetic recording and reproducing head unit is assembled.

It has, therefore, been a usual practice in assembling a magnetic recording and reproducing head unit to data, as shown in FIG. 7, to adjust the mutual positional relationship between individual tape guide members 5-7 and individual magnetic heads 8 and 9 on a bottom plate 4 of the tape guide by the use of mechanical stages 10, 11 for positioning thereof along the X and Y axes and another mechanical stage 12 for azimuth adjustment and, after fixing thereof using an adhesive, to set a top plate (not shown) in place.

With regard to the magnetic recording and reproducing head unit shown in FIG. 7, however, there was a problem of an extremely long time required for assembling the tape guide and the magnetic head after adjustment of the positional relation therebetween. This delay results in a lowered productivity.

Figure 8:
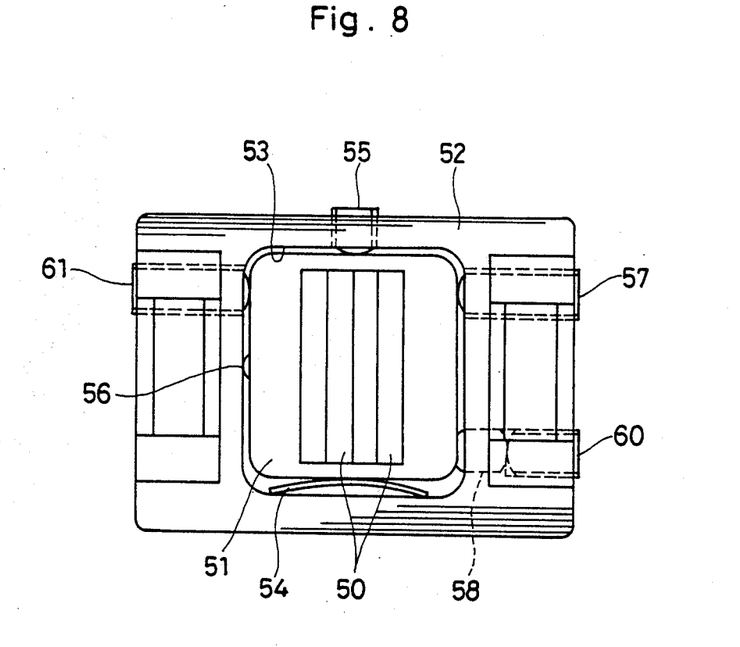
FIG. 8 is a front elevation showing the essential parts of another conventional magnetic recording and reproducing head unit.

As seen from FIG. 8, therefore, the present inventor contrived an arrangement in which a housing case 51 having a magnetic head 50 housed and fixed therein is positioned and fixed in a hole 53 provided in a position adjusting portion 52 of the tape guide, and for this a patent application has already been made in Japan (Application No. 59657, '87), published as an unexamined patent application No. (Tokukaisho) as 63-225911.

In this arrangement a curved leaf spring 54 for urging the housing case 51 is positioned between the housing case 51 and the bottom of the hole 53, and the position adjusting portion 52 has a tapped hole near the top thereof for a height-adjusting screw 55 for adjusting the height of a magnetic head 50 in contact with the top of the housing case 51.

On one side of the housing case 51, a convex portion 56 is in contact with the bore of the hole 53, and the position adjusting portion 52 has an adjusting screw 57 set therethrough for pushing the other side of the housing case 51 near the top thereof and another adjusting screw 60 for pushing the aforesaid side near the bottom thereof. Through a springy piece 58 and through adjustment by these screws 57 and 60, the housing case 51 can be pivoted with the convex portion 56 as a fulcrum for proper adjustment of the inclination angle of the magnetic head 50. Opposite to the adjusting screw 57 with respect to the housing case 51, a fixing screw 61 is provided through the position adjusting portion 52 for tentatively fixing the housing case 51 to the position adjusting portion 52.

In the construction illustrated in FIG. 8, however, the height of the magnetic head 50 is arranged to be determined as the housing case 51 is pressed against the height adjusting screw 55 by the urging force of the leaf spring 54. Hence, the inclination angle of the magnetic head 50 is changed as the adjustment of the height of the magnetic head 50. Therefore, sufficient precision is difficult to attain with regard to adjustment of both height and inclination of the magnetic head 50. Another problem was the inevitable complication of the construction as the position adjusting portion 52 had to be provided with such adjusting and fixing means as the adjusting screws 57 and 60 and the fixing screw 61 et cetera.

SUMMARY OF THE INVENTION

It is a primary object of the present invention to provide a magnetic recording and reproducing head unit which allows easy attachment of a magnetic head to a tape guide accurately positioned thereto without the use of such instruments as a mechanical stage.

Another object of the present invention is provision of a magnetic recording and reproducing head simplified in construction by dispensing with incorporation of the tape guide of the adjusting members hitherto required for adjustment of the height of the track pattern and the inclination angle of the magnetic head.

For accomplishment of the aforesaid objects, the present invention, which relates to a magnetic recording and reproducing head unit composed of a tape guide and a magnetic head, is characterized in that there are provided a top plate and a bottom plate connected with a given distance therebetween, between which there is arranged the aforesaid tape guide including a center member, a reference plane representing either of the opposite surfaces of the aforesaid top and bottom plates and a convex portion formed on at least one side of the aforesaid center member, and the aforesaid magnetic head is inserted between the top and bottom plates along the side of the aforesaid center member and with its end face pressed against the aforesaid reference plane and thereby the height of the track pattern is limited with simultaneous pivoting of the magnetic head with the aforesaid convex portion as a fulcrum for azimuth adjustment to be done.

In a more concrete embodiment, left and right spacers are provided between the top and bottom plates to keep a given distance therebetween, and a plurality of guide poles for guiding a magnetic tape are also provided.

Also, in order to control the height of the track pattern of the magnetic head, it may concretely be feasible, for instance, to provide on the topside of the aforesaid bottom plate, upper guide faces which come into contact with the left and right spacers and a guide head face as a reference plane having a given difference in level against the aforesaid upper guide faces.

Where the topside of the bottom plate is taken as the reference plane, the aforesaid magnetic head may have the bed plate fixed behind the head portion and have the underside of the bed plate above the underside of the head portion so that the underside of the head portion alone is in agreement with the reference plane.

Where the topside of the bottom plate is taken as the reference plane, it may as well be so arranged that a predetermined distance is set between the underside of the aforesaid head portion and the track pattern so that the height of the track pattern is adjusted accordingly.

Another alternative may be to set the height of the aforesaid center member to be a bit smaller than the distance between the top and bottom plates and have the center member attached to the top plate with its topside in contact with the underside of the top plate.

In a still more concrete embodiment, it is possible to have each one convex portion on both sides of the aforesaid center member and have it so dimensioned that the distance between the opposite tips of the convex portions agree with the predetermined one, and to have a pair of magnetic heads inserted along both sides of the aforesaid center member between the top and bottom plates. In such a case, the aforesaid center member may have its width increased toward the forward ends of the pair of magnetic heads inserted along both sides thereof to be approximately trapezoidal in plan view.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 4 (a) and (b) are the plan view and the front elevation of the center spacer used in the magnetic recording and reproducing head unit;

FIG. 6 (a) and (b) are a schematic front elevation and a schematic plan view showing the positional relationship between the magnetic head and the tape guide;

DESCRIPTION OF THE EMBODIMENTS

Referring to the accompanying drawings, FIGS. 1 through 5 show a preferred embodiment of the present invention which is now described in greater detail.

Figure 1:
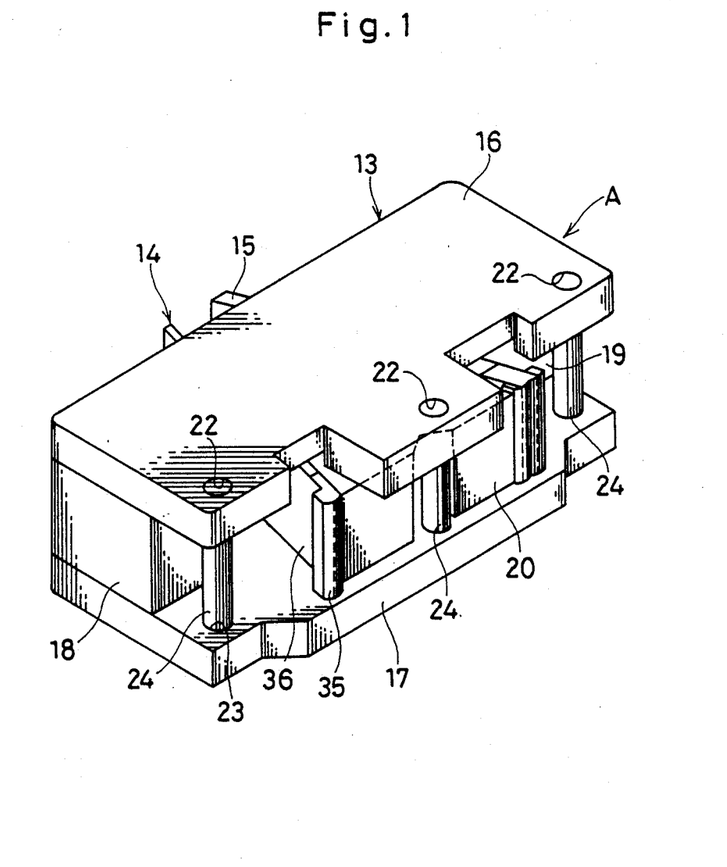
FIG. 1 is a perspective view of the magnetic recording and reproducing head unit of the present invention.

As shown in FIG. 1, a magnetic recording and reproducing head A comprises a tape guide 13 and two magnetic heads 14 and 15. The tape guide 13 is made up of a top plate 16, a bottom plate 17, a left spacer 18, a right spacer 19 and a center spacer 20 serving as a center member. The magnetic heads 14 and 15 are arranged along both left and right sides of the center spacer 20.

Figure 2:
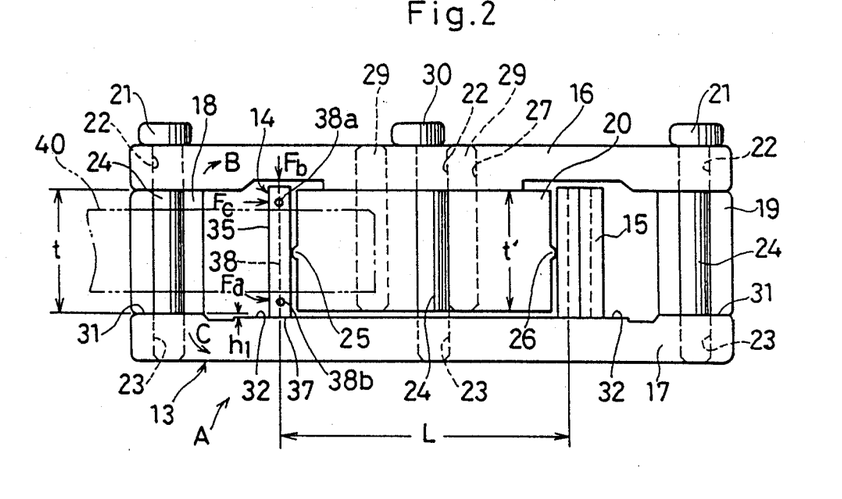
FIG. 2 is a front elevation of the magnetic recording and reproducing head unit of the present invention.
Figure 3:
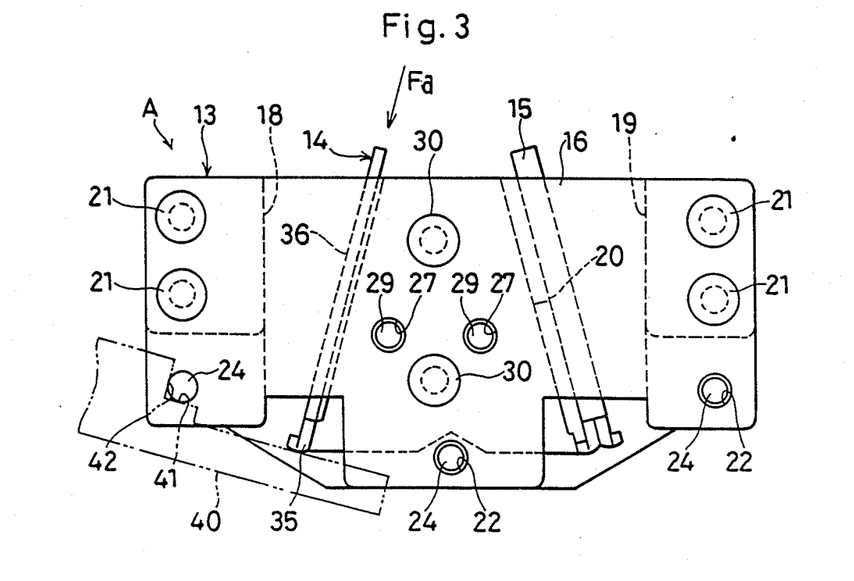
FIG. 3 is a plan view of the magnetic recording and reproducing head unit of the present invention.

As seen from FIG. 2 and FIG. 3, the height "t" of the left spacer 18 and the right spacer 19 is set to be somewhat smaller than the width of the magnetic tape (not shown), and the top plate 16 and the bottom plate 17 are connected by screws 21, 21 outside the left and right spacers. The top plate 16 and the bottom plate 17 are, therefore, disposed parallel to each other at a predetermined distance "t". Holes 22, 22 . . . , 23, 23 . . . provided at a plurality of positions near the front edges of the top plate 16 and the bottom plate 17 have the upper and lower ends of guide poles 24 and 24 . . . set therein for guiding the aforesaid magnetic tape respectively.

Figures 4A, 4B:
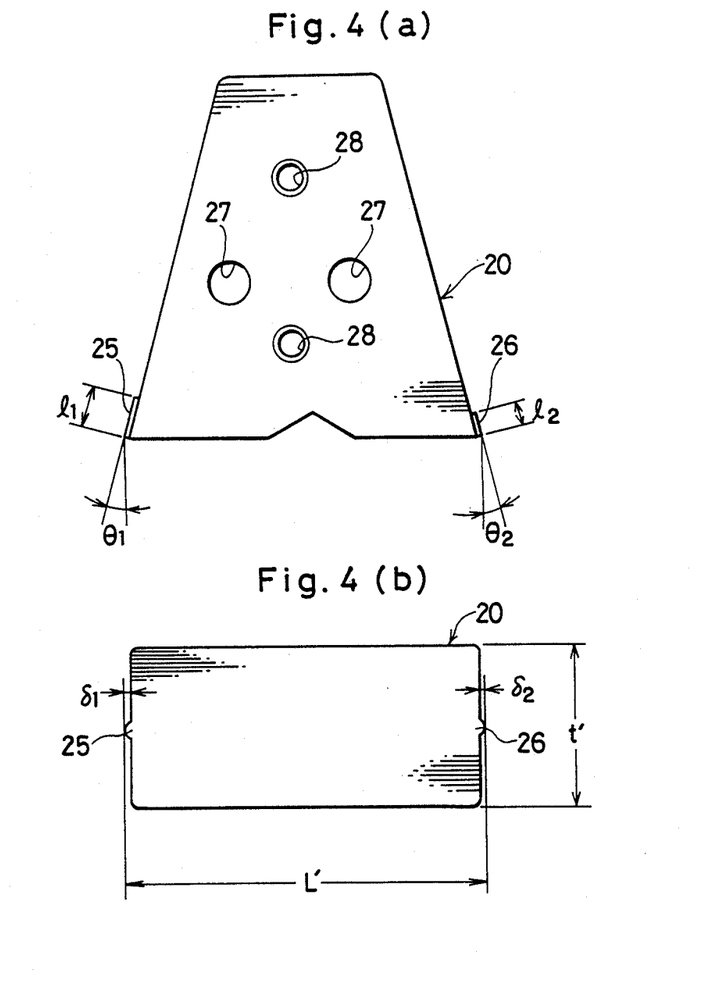

As seen from FIGS. 4 (a) and (b), the center spacer 20 is finished to a height t' which is somewhat less than that of the left spacer 18 and right spacer 19. On both left and right sides of the center spacer 20, convex portions 25 and 26 are formed as protrusions or crownings roughly semicircular in section. The sideway projections of the convex portions 25 and 26 are set at $\delta_1$ and $\delta_2$, the lengths of the convex portions 25 and 26 along the sides of the center spacer 20 are set at $l_1$ and $l_2$, the inclination angle of the convex portions 25, 26 against the horizontal, longitudinal line of the tape guide 13 is set at the predetermined $\theta_1$ and $\theta_2$, and the distance between the tips of the two convex portions 25 and 26 is set at L' respectively.

The center spacer 20 has pin holes 27 and 27 and tapped holes 28 and 28 provided therein. The center spacer 20 is fixedly secured to the top plate 16 with the topside thereof fitting closely to the underside of the top plate 16 by the use of positioning pins 29, 29 and screws 30, 30. The center spacer 20 is increased in width toward the tips of the magnetic heads 14 and 15 inserted along both sides thereof so as to be trapezoidal in plan view.

As seen from FIG. 2, the bottom plate 17 is precision-finished with a predetermined difference in level of $h_1$ between an upper guide face 31 which comes into contact with the lower end faces of left spacer 18 and the right spacer 19, and a guide head face 32 which is taken as a reference plane.

Figure 5:
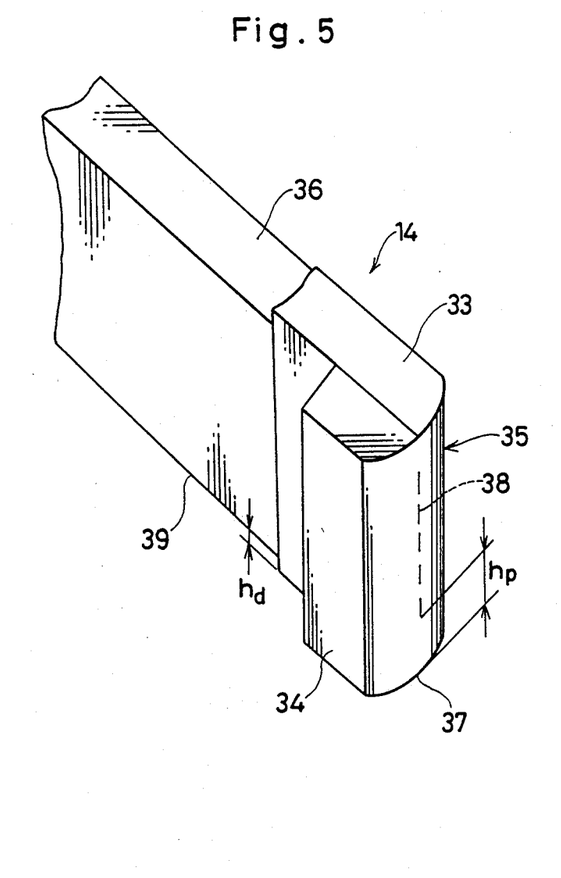
FIG. 5 is a perspective view of the magnetic head of the magnetic recording and reproducing head unit.

As seen from FIG. 5, the magnetic head 14 comprises a head portion 35 consisting of a head board 33 and a protective plate 34. Although no detailed illustration is shown, this head portion 35 comprises integrated circuits, capacitors et cetera housed in a case and is bonded to a base board 36 located behind it. A underside 37 as the end face of the head portion 35 is precision-finished so that a predetermined distance of $h_p$ is provided between it and the lower end of a track pattern 38. The underside 37 is directly pressed onto a guide head face 32, not covered by the aforesaid case.

The base board 36 is attached to the head portion 35 so that an underside 39 of the base board 36 is at a level higher than the underside 37 of the head portion 35 by $h_d$. Thence, even if the underside 37 of the head portion 35 should be pressed against the guide head face 32, the underside 39 of the base board 36 does not come into contact with the guide head face 32. A gap is also provided between the base board 36 and the center spacer 20. The magnetic head 15 is composed similar to the magnetic head 14. The positional relationship of the magnetic head 15 with the guide head face 32 etc. is being the same as described above.

Hereinafter, the assembling procedure for the aforesaid magnetic recording and reproducing head unit A is to be described.

First, the top plate 16 and the bottom plate 17 are connected using the screws 21 with the left spacer 18 and the right spacer 19 in between and the upper and lower ends of the guide poles 24, 24 ... are set in the holes 22, 22 ... and 23, 23 ... Then, the center spacer 20 is secured to the top plate 16 by the use of the pins 29, 29 and the screws 30, 30 and the assembly of the tape guide 13 is now over.

Then, as shown in FIGS. 2 and 3 by two-dot chain line, a front reference plate 40 for the assembling apparatus is positioned at a predetermined inclination angle against the tape guide 13, the corners of pole contact faces 41 and 42 are applied to the guide pole 24 (set through a hole) on the left-hand side of the tape guide 13, and the guide pole 24 is fixed to the aforesaid front reference plate 40 by means of a vacuum, for example.

Now, the magnetic head 14 is inserted into the space between the top plate 16 and the bottom plate 17 along the sides of the center spacer 20, and the front end of the magnetic head 14 is pressed against the front reference plate 40, and kept pressed with a force Fa applied longitudinally of the magnetic head 14 by means of a spring or the like (not shown).

Thereafter, the topside of the head portion 35 of the magnetic head 14 is pressed down with a pin or the like (not shown) with a force Fb to have the lower end face 37 of the magnetic head 14 pressed against the guide head face 32. Further horizontal forces Fc and Fd are applied at two, upper and lower, positions on the protective plate 34 of the head portion 35 to have the head board 33 of the head portion 35 pressed against the convex portion 25 formed on the side of the center spacer 20.

Now, an optical observation system for observing two points 38a and 38b on the track pattern 38, for instance, the upper and lower ends of the track pattern 38 of the magnetic head 14, is arranged opposite to the magnetic head 14. If the magnetic head 14 is to be attached to the tape guide 13 to be perpendicular to the bottom plate 17, electronic lines perpendicular to the guide head face 32 of the bottom plate 17 are to be set on the monitor of the optical observation system. The forces Fc and Fd are so adjusted that the two points 38a and 38b displayed on the monitor are both overlapped on the aforesaid electronic lines, and the magnetic head 14 is caused to pivot in the direction B or C with the convex portion 25 as a fulcrum. The moment the images of the two points 38a and 38b have overlapped with the aforesaid electronic lines, an instantaneous adhesive or the like may be poured into the gap between the magnetic head 14 and the center spacer 20 to tentatively fix the magnetic head 14 to the tape guide 13.

It is thereby possible to accomplish azimuth adjustment of the track pattern 38 of the magnetic head 14 and, further, the height of the track pattern 38 can be fixed at a predetermined level above the guide head face 32 taken as the reference plane on the bottom plate 17.

The upper guide face 31 and the guide head face 32 of the bottom plate 17 are precision-finished for the difference in level to be $h_1$, and the finishing precision is also high so that the distance between the underside of the head portion 35 and the lower end of the track pattern 38 is exactly $h_p$. Moreover, the head portion 35 is not encased and is directly pressed against the guide head face 32, hence the error for the height from the upper guide face 31 to the lower end of the track pattern 38 is as small as 10-odd $\mu m$.

The other magnetic head 15 is also positioned in the same way as described above, and is tentatively fixed to the tape guide 13. Since the distance between the convex portions 25 and 26 on the center spacer 20 is set constantly at $L'$, the distance between the magnetic heads 14 and 15 is also constant, L. The tape guide 13 and the magnetic heads 14 and 15 thus assembled are taken out of the assembling apparatus and are temporarily bonded together using an adhesive, and the magnetic recording and reproducing head unit A is thus completed.

In the above embodiment, the magnetic heads 14 and 15 are attached to the tape guide 13 to be perpendicular to the bottom plate 17, but these may as well be attached to the bottom plate 17 at some other predetermined angle of inclination. It is also possible to first determine the height of the track pattern 38 of the magnetic heads 14 and 15 with the underside of the top plate 16 as the reference plane, and then attach the magnetic heads 14 and 15 to the tape guide 13 at the predetermined angle of inclination.

Also, in the above embodiment the top plate 16 and the bottom plate 17 are disposed parallel to each other at a distance "t" by the left spacer 18 and the right spacer 19, but these may as well be disposed parallel to each other at a distance "t" by the center spacer 20 which is finished to a height "t" instead of the left spacer 18 and the right spacer 19.

Thus, with the magnetic recording and reproducing head unit of the present invention, it is possible to preassemble the tape guide and then attach the magnetic heads to the tape guide with ease after precise positioning with respect thereto. Further, since the adjustment of the inclination angle of the magnetic heads to the tape guide is to be done on an assembling apparatus separate from that for assembling the magnetic recording and reproducing head unit, the construction of the magnetic recording and reproducing head unit can be simplified with ease.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording and reproducing head unit having a tape guide and at least one magnetic head comprising:
   a top plate and a bottom plate, said top and bottom plates being connected at a predetermined distance and a reference plane being set on either an underside of said top plate or a topside of said bottom plate;
   a center member of the tape guide, said center member being disposed between said top and bottom plates;

a convex portion formed on at least one side of said center member, said at least one magnetic head being positioned along a side of said center member between said top and bottom plates with an end face thereof being against the reference plane to thereby limit height of a track pattern of said at least one magnetic head, the at least one magnetic head being pivotable about said convex portion which acts as a fulcrum to thereby adjust azimuth thereof.

2. The magnetic recording and reproducing head unit in accordance with claim 1, wherein said at least one magnetic head has a base board disposed behind a head portion thereof and an underside of said base board being at a level higher than an underside of said head portion.

3. The magnetic recording and reproducing head unit in accordance with claim 1, wherein a predetermined distance is provided between an underside of a head portion and said track pattern of the at least one magnetic head.

4. The magnetic recording and reproducing head unit in accordance with claim 1, wherein said convex portion is formed on both sides of said center member, a distance between tips of said convex portions being a predetermined value and a pair of magnetic heads being positioned along both sides of said center member between said top and bottom plates.

5. The magnetic recording and reproducing head unit in accordance with claim 4 wherein said center member has a substantially trapezoidal shape in plan view, widening toward the forward ends of said pair of magnetic heads positioned along both sides of the center member respectively.

6. The magnetic recording and reproducing head unit in accordance with claim 1, wherein a left spacer and a right spacer are arranged on both sides of said center member for keeping a predetermined distance between said top and bottom plates and also a plurality of guide poles are disposed between said top and bottom plates for guiding a magnetic tape.

7. The magnetic recording and reproducing head unit in accordance with claim 2, wherein the left and right spacers for keeping the predetermined distance between said top and bottom plates are attached to said top and bottom plates with upper and lower end faces thereof in close contact with the underside of said top plate and the topside of said bottom plate.

8. The magnetic recording and reproducing head unit in accordance with claim 6, wherein the topside of said bottom plate has upper guide faces provided therein, said upper guide faces being in contact with lower end faces of said left and right spacers and a guide head face representing said reference plane with a predetermined level difference against said upper guide faces.

9. The magnetic recording and reproducing head unit in accordance with claim 6, wherein said center member has a height which is slightly smaller than a distance between said top and bottom plates and said center member is attached to said top plate with an upper end face thereof in close contact with the underside of said top plate.

* * * * *